2,900,311
PURIFICATION OF ACETOACETIC ESTERS BY DISTILLATION

Amelio E. Montagna, Charleston, W. Va., assignor to Union Carbide Corporation, a corporation of New York No Drawing. Application October 11, 1952
Serial No. 314,401

4 Claims. (Cl. 202—57)

This invention is concerned with an improved process for the purification of acetoacetic acid esters, for instance, ethyl acetoacetate.

Ethyl acetoacetate is an intermediate for the manufacture of a number of industrial products derived therefrom, as for instance, phenyl methyl pyrazolone by reaction with phenylhydrazine; beta-methylumbelliferone by reaction with resorcinol; acetoacet-arylamides by reaction with aniline, toluidines, chloroanilines, naphthylamines, anisidines, benzidine, tolidines and the like. Because of requirements for high quality with respect to such products, particularly as to color, without impairment of high yield, the ethyl acetoacetate must be of high quality.

As is well-known, ethyl acetoacetate and other acetoacetic esters normally exist as equilibrium mixtures of tautomeric isomers:

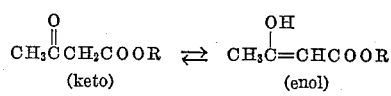

$$CH_3\overset{O}{\overset{\|}{C}}CH_2COOR \rightleftarrows CH_3\overset{OH}{\overset{|}{C}}=CHCOOR$$
(keto) (enol)

where —OR is the radical of an alcohol. As is also well-known, the equilibrium concentrations vary somewhat with temperature and the presence of catalyst, but the keto form always predominates. The speed with which a non-equilibrium mixture comes to equilibrium likewise depends upon the temperature and the presence of catalyst in accord with well-established principles. At ordinary room temperature and in the complete absence of any catalytically active material, the rate of shift is relatively slow and several days might elapse before a non-equilibrium mixture returns to equilibrium.

The boiling points of the tautomeric isomers of acetoacetic esters are quite different. For instance, the enol isomer of ethyl acetoacetate boils at approximately 42° C. at an absolute pressure of 10 millimeters of mercury while the keto isomer boils at approximately 63° C. In an ordinary fractional distillation of ethyl acetoacetate at an absolute pressure of 10 millimeters of mercury, the first distillate that comes over is richer in the enol isomer than the starting mixture because of the lower boiling point of that isomer. The vapor temperature rises quickly beyond the boiling point of the enol isomer, however, as the starting material is depleted of that isomer, and then remains at or slightly below the boiling point of the keto isomer. The total distillate is predominantly the keto isomer, as was the starting material.

An acetoacetic ester as produced from diketene and ethanol or other alkanol may contain by-product impurities having boiling points very near to the boiling point of the keto isomer. One of these impurities is known to be ethyl 3-ethoxycrotonate (ethyl ether of the enol isomer of ethyl acetoacetate), but there are others whose identity is unknown. In ordinary fractional distillation these impurities, known and unknown, distill over wholly, or in part with the ethyl acetoacetate, making it virtually impossible to produce an acetoacetic ester of a purity sufficiently high for its industrial uses.

The present improvement is based upon my discovery that by conducting the vaporizing step of the distillation of the acetoacetic ester in the presence of an alkaline catalyst and the rectification step of the vapor thus produced in the complete absence of catalyst, it is possible to separate the ester from its impurities. In thus effecting the separation, advantage is taken of the difference in boiling points of the enol and keto isomers, and of a rapid rate of shift of equilibrium in the presence of a catalyst, in the vaporizer or still kettle, on the one hand, and of the slow rate of shift of equilibrium in the complete absence of catalytic substances in the rectifying zone on the other.

In practicing my process, the acetoacetic ester to be purified to which has been added a catalytic amount of alkaline substance is vaporized in a still kettle or other suitable vessel and the vapors rectified in a rectification column which must not possess an alkaline reaction, such as is exhibited for instance by soft glass. The rectifying column may be constructed of any of a number of suitable materials free of alkaline substance in any catalytic amount, as for instance, quartz, corrosion-resistant metals, boro-silicate glasses, Pyrex glass and the like. The distillation is so conducted that the vapor temperature is maintained at the boiling point of the enol isomer or slightly above it, but in any event substantially below the boiling point of the keto isomer. In the rectification column, the vapor which emanates from the boiler as a mixture of the two isomers undergoes a separation into its main components whereby the vapor reaching the top of the column is largely the enol isomer while the liquid returned to the kettle is largely the keto isomer. The impurities remain in the still kettle or if vaporized are returned to the still kettle in the keto isomer liquid. The enol isomer vapor from the top of the rectifier is condensed in a condenser and collected in a receiver.

Because the rate of equilibrium shift is so slow in the rectifying column where no catalytic material is present, the mixture of isomers behaves like a mixture of two different compounds having as widely separated boiling points. Hence a separation is possible.

Because the rate of equilibrium shift is so fast in the vaporizer or still kettle where an alkaline catalyst is present, the kettle liquid is continuously and almost instantly maintained at the equilibrium composition. Consequently there is a continuous supply of enol isomer for vaporization so that as the distillation proceeds, nearly all of the acetoacetic ester is distilled overhead largely as the enol isomer, leaving as residue in the still kettle the impurities together with any undistilled ester.

The distillate collected in the receiver eventually reverts to an equilibrium mixture of the isomers and is not chemically different from that obtained by ordinary distillation except that it contains a lower concentration of impurities.

Although the temperature and pressure conditions which can be employed in carrying out my improved process are not narrowly critical, it is to be borne in mind acetoacetic ester decomposes to an appreciable extent when heated for long periods of time at its boiling point at atmospheric pressure. Inasmuch as the rate of decomposition is dependent upon the temperature, it is usually advisable to operate at a kettle temperature not higher than 120° C. and preferably at 100° C. or lower, At a temperature of about 100° C. the rate of decomposition is less than 0.1 percent per hour, by weight.

Additionally, affecting the choice of temperature, is the rate of shift of the keto-enol equilibrium which, in the absence of catalysts, is proportional to the temperature. The ideal or optimum situation would be when no shift occurred in the still column where the separation of the isomers is to be effected, a situation not possible to achieve. The amount of shift can be minimized, however, and the ease and efficiency of the separation increased by operating at as low a temperature as is practicable. In general, I prefer to operate at pressures from about 10 to 50 millimeters of mercury, absolute, although higher and lower pressures can also be employed with good results. With pressures lower than 10 millimeters of mercury, absolute, the use of a cooling medium other than ordinary cooling water to condense the vapor probably will be required. An absolute pressure of about 10 to 20 millimeters of mercury is especially preferred.

As catalyst, any alkaline reacting substance can be employed in an amount which is about 0.01 to 1.0 part per 100 parts of the acetoacetic ester charge by weight. The preferred catalysts include the alkaline compounds of sodium and potassium, as for instance the oxides, hydroxides, the carbonates, bicarbonates, acetates and other carboxylates, alcoholates or other derivatives such as can be formed using the free metals which react with acetoacetic ester to form soluble compounds thereof.

The invention is further illustrated by the following examples:

Example 1

Semi-refined ethyl acetoacetate (918 grams) having a purity of 91.9 percent together with one gram (0.11 percent of the charge, by weight) of anhydrous sodium acetate was charged to the still kettle of a distillation apparatus and distilled at an absolute pressure of 10 millimeters of mercury at a reflux ratio between two to one and three to one. The still kettle which was a one-liter Pyrex glass flask was fitted with a still column and a water-cooled, total condensing, variable-takeoff still head, both of Pyrex glass also. The still column which was 3.2 centimeters in diameter by 50 centimeters long was packed with stainless steel sponge, and had a fractionating capacity equivalent to ten theoretical plates when calibrated with heptane-methylcyclohexane at atmospheric pressure at total reflux.

There was first obtained 15 grams (1.6 percent of the charge) of a low-boiling fraction containing 51.4 percent ethyl acetoacetate. The bulk of the distillate amounting to 755 grams (82.3 percent of the charge) came over at a vapor temperature of 40° C. to 50° C. at an absolute pressure of 10 millimeters of mercury and had a purity of 98.8 percent. Thereafter the vapor temperature could no longer be held below 50° C. at a reflux ratio of 3 to 1. Accordingly, another fraction was taken coming over at a vapor temperature of 50° C. to 60° C. amounting to 55 grams (6.0 percent of the charge) with a purity of 95.1 percent. The kettle residue amounted to 66 grams (7.2 percent of the charge) and contained 20.0 percent ethyl acetoacetate. The total material recovered was 97.1 percent of the original charge, with 97.0 percent of the ethyl acetoacetate being accounted for.

By way of comparison a similar sample of ethyl acetoacetate of 93.3 percent purity was distilled in the same apparatus at the same reduced pressure but without the addition of anhydrous sodium acetate or another alkaline catalyst. The low boiling fraction amounted to 0.7 percent of the charge; the main fraction distilling from 42° C. to 62° C. amounted to 81.4 percent of the charge and had a purity of 95.9 percent; an after-fraction from 62° C. to 68° C. amounted to 13.9 percent of the charge and had a purity of 91.3 percent; and the kettle residue amounted to 1.8 percent. The results of the two distillations are summarized as follows:

|  | With Sodium Acetate | Without Sodium Acetate |
|---|---|---|
| First Fraction, percent of charge | 0.7 | 1.6 |
| Main Fraction: |  |  |
| Vapor temperature, °C | 40 to 50 | 42 to 62 |
| Percent of charge | 82.3 | 81.4 |
| Purity, percent | 98.8 | 95.9 |
| After Fraction: |  |  |
| Vapor temperature, °C | 50 to 62 | 62 to 68 |
| Percent of charge | 6.0 | 13.9 |
| Purity, percent | 95.1 | 91.3 |
| Kettle residue, percent of charge | 7.2 | 1.8 |

Example 2

A distillation of ethyl acetoacetate having a purity of 94.6 percent was conducted in the same apparatus employed in Example 1 and in accord with procedure as described except that the vapor temperature was held at or below 45° C. during the distillation of the main fraction. From an original charge of 820 grams of material there was obtained 676 grams of ethyl acetoacetate having a purity of 99.4 percent for a recovery of 82.4 percent of the charge.

Example 3

Semi-refined ethyl acetoacetate (920 grams) having a purity of 93.0 percent was purified by distillation in accord with the method described in Example 1, except that instead of sodium acetate the alkali employed was the sodium alcoholate of ethylene glycol monobutyl ether in a 50 percent solution of ethylene glycol monobutyl ether. The amount of solution employed was 2 grams corresponding to 0.11 part of the alcoholate per 100 parts of the still charge. In two separate runs the purities of the refined ethyl acetoacetate were 98.7 and 99.1 percent with recoveries of 80 and 81 percent, respectively, based on the still charge. Using ordinary distillation in the absence of alkaline catalyst, the purity of refined product was 97.0 percent with 80 percent recovery based on the still charge.

Example 4

Ethyl acetoacetate (910 grams) having a purity of 88 percent was subjected to distillation in the presence of 0.16 part of anhydrous sodium acetate according to the procedure described in Example 1. There was obtained 632 grams of refined ethyl acetoacetate having a purity of 98.7 percent. Using the same procedure in the absence of sodium acetate or other alkali, ethyl acetoacetate having purities of 94.9 and 95.3 percent were obtained starting with charges containing 90 and 87 percent ethyl acetoacetate, respectively.

Example 5

Example 4 was repeated using 0.11 part of anhydrous sodium carbonate instead of sodium acetate per 100 parts of ethyl acetoacetate contained in the charge. A product having a purity of 98.7 percent ethyl acetoacetate was obtained.

Example 6

Semi-refined ethyl acetoacetate (about 900 grams) having a purity of 95 percent was purified by distillation according to the procedure of Example 1 in the presence of 0.2 part of anhydrous sodium acetate per 100 parts of ethyl acetoacetate. In nine separate runs the purities of the distilled products were 99.2; 98.8; 99.2; 99.1; 99.0; 98.8; 99.2; 99.7 and 99.0 percent, respectively, while in two additional runs using no sodium acetate or other alkali the purities were 97.2 and 97.7 percent.

Example 7

On repeating Example 6, using a 50 percent solution of the sodium alcoholate of diethylene glycol monobutyl ether in diethylene glycol monobutyl ether as alkali instead of sodium acetate, there was obtained ethyl acetoacetate of 99.3 percent purity.

What is claimed is:

1. In a distillation process for purifying an acetoacetic ester, the improvement consisting of rapid purification of said ester with respect to impurities with boiling points near that of the keto isomer, which comprises treating said acetoacetic ester with about 0.01 to 1.0 part for each 100 parts of the ester by weight of an alkaline substance so as to continuously supply the enolic form of the ester while vaporizing said enolic ester under reduced pressure at a temperature not higher than 100° C. and distilling the vapors thus produced over-head free of alkaline substances and the keto isomer, and allowing such distillate of enolic ester thus obtained to revert to an equilibrium mixture of the isomers.

2. In a distillation process for purifying an acetoacetic ester, the improvement consisting of rapid purification of said ester with respect to impurities with boiling points near that of the keto isomer, which comprises treating said acetoacetic ester with about 0.01 to 1.0 part per each 100 parts of the ester by weight of an alkaline compound of a metal selected from the group consisting of sodium and potassium so as to continuously supply the enolic form of the ester while vaporizing said enolic ester under reduced pressure at a temperature not higher than 100° C. and distilling the vapors over-head free of alkaline substances and the keto isomer, and allowing the distillate of enolic ester thus obtained to revert to an equilibrium mixture of the isomer.

3. In a distillation process for purifying an acetoacetic ester, the improvement consisting of rapid purification of said ester with respect to impurities with boiling points near that of the keto isomer, which comprises treating said acetoacetic ester with about 0.01 to 1.0 part per each 100 parts of the ester by weight of an alkaline substance so as to continuously supply the enolic form of the ester while vaporizing said enolic ester at an absolute pressure not higher than 50 mm. of Hg and distilling the vapors thus produced over-head free of alkaline substances and the keto isomer, and allowing the distillate of enolic ester thus obtained to revert to an equilibrium mixture of the isomers.

4. In a distillation process for purifying an acetoacetic ester, the improvement consisting of rapid purification of said ester with respect to impurities with boiling points near that of the keto isomer, which comprises treating said acetoacetic ester with about 0.01 to 1.0 part per each 100 parts of the ester by weight of an alkaline compound of a metal selected from the group consisting of sodium and potassium so as to continuously supply the enolic form of the ester while vaporizing said enolic ester at an absolute pressure of about 10 to 20 mm. of Hg and distilling the vapors over-head free of alkaline substances and the keto isomer, and allowing the distillate of enolic ester thus obtained to revert to an equilibrium mixture of the isomers.

References Cited in the file of this patent

Decombe: Anneles de Chimie, Series 10, Tome 18, pages 96–102 (1932).

Chemical Trade Journal and Chemical Engineer, Sept. 19, 1947, pages 293 and 294.

Organic Chemistry, 2nd ed., Fieser et al., 1950, pages 310–312.

Meyer et al.: Ber., 53, 1410–1415, 1920.

Meyer et al.: Ber., 54, 579, 580, 1921.